United States Patent
Weinzettl et al.

(10) Patent No.: US 11,070,371 B2
(45) Date of Patent: **\*Jul. 20, 2021**

(54) DETECTION AND PROTECTION OF DATA IN API CALLS

(71) Applicant: International Business Machines Corporation, Armonk, NY (US)

(72) Inventors: Thomas Weinzettl, Lilienfeld (AT); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 307 days.

This patent is subject to a terminal disclaimer.

(21) Appl. No.: 16/353,231

(22) Filed: Mar. 14, 2019

(65) Prior Publication Data

US 2020/0295922 A1  Sep. 17, 2020

(51) Int. Cl.
| | |
|---|---|
| *H04L 29/06* | (2006.01) |
| *H04L 9/08* | (2006.01) |
| *G06F 9/54* | (2006.01) |
| *G06F 21/60* | (2013.01) |
| *H04L 9/14* | (2006.01) |
| *G06F 21/62* | (2013.01) |

(52) U.S. Cl.
CPC .............. *H04L 9/088* (2013.01); *G06F 9/547* (2013.01); *G06F 21/602* (2013.01); *G06F 21/6245* (2013.01); *H04L 9/0861* (2013.01); *H04L 9/0894* (2013.01); *H04L 9/14* (2013.01)

(58) Field of Classification Search
CPC ......... H04L 9/088; H04L 9/14; H04L 9/0894; H04L 9/0861; H04L 9/0866; G06F 9/547; G06F 21/602; G06F 21/6245; G06F 21/6281; G06F 9/4484

See application file for complete search history.

(56) References Cited

U.S. PATENT DOCUMENTS

| | | |
|---|---|---|
| 6,324,650 B1 | 11/2001 | Ogilvie |
| 8,069,053 B2 | 11/2011 | Gervais et al. |
| 8,346,532 B2 | 1/2013 | Chakra et al. |

(Continued)

OTHER PUBLICATIONS

IBM, "Interception in IBM MQ AMS", IBM Knowledge Center, Last updated Oct. 29, 2018, 2 pages.

(Continued)

*Primary Examiner* — John B King
(74) *Attorney, Agent, or Firm* — Daniel M. Yeates

(57) ABSTRACT

Aspects of the present disclosure relate to detecting and protecting a class of data in an API call including determining a plurality of field names and identifying a field name to search for in the data. The technique further includes generating, in response to the identifying the field name, an encryption key and an expiration, wherein the encryption key is configured to encrypt the data. The technique also comprises encrypting the data, sending the API call to an application server, wherein the application server is configured to process the API call. The technique also includes receiving, from the application server, a request for the encryption key and validating that the encryption key has not expired. The technique also includes, sending, in response to being valid, the encryption key to the application server, and storing, in a database, a set of usage data associated with the encryption key.

10 Claims, 5 Drawing Sheets

(56) References Cited

U.S. PATENT DOCUMENTS

| | | | |
|---|---|---|---|
| 10,917,401 B1* | 2/2021 | Mantin | G06F 9/54 |
| 2004/0162786 A1* | 8/2004 | Cross | H04L 9/30 705/59 |
| 2006/0005017 A1* | 1/2006 | Black | H04L 9/0891 713/165 |
| 2006/0143459 A1 | 6/2006 | Villaron et al. | |
| 2012/0017078 A1* | 1/2012 | Reno | H04L 9/06 713/153 |
| 2012/0173962 A1* | 7/2012 | Oh | G06F 16/9577 715/234 |
| 2016/0088109 A1 | 3/2016 | Chen et al. | |
| 2017/0104756 A1 | 4/2017 | Rosenthal et al. | |
| 2017/0116206 A1* | 4/2017 | Gumerato | G06F 16/273 |
| 2017/0161486 A1 | 6/2017 | Jeon et al. | |
| 2017/0295206 A1* | 10/2017 | Feiertag | G06F 8/61 |
| 2018/0191692 A1 | 7/2018 | Frank | |
| 2019/0034929 A1* | 1/2019 | Tang | H04L 9/0894 |
| 2019/0132378 A1* | 5/2019 | Perl | G06F 16/9566 |
| 2019/0229890 A1* | 7/2019 | Brehmer | H04L 9/3242 |
| 2019/0303626 A1* | 10/2019 | Kaladgi | G06F 3/0484 |
| 2020/0076578 A1* | 3/2020 | Ithal | G06F 16/2255 |

OTHER PUBLICATIONS

Mell et al., "The NIST Definition of Cloud Computing", Recommendations of the National Institute of Standards and Technology, Sep. 2011, 7 pages.

Weinzettl et al., "Detection and Protection of Data in API Calls", U.S. Appl. No. 16/508,389, filed Jul. 11, 2019.

IBM, List of IBM Patents or Patent Applications Treated as Related, Jun. 20, 2019, 2 pages.

* cited by examiner

US 11,070,371 B2

DETECTION AND PROTECTION OF DATA IN API CALLS

BACKGROUND

The present disclosure relates to data protection, and, more specifically, to protecting personal data during an individual application program interface (API) call.

Information privacy (e.g., data privacy or data protection) is the relationship between the collection and dissemination of data, the technology used to collect and disseminate data, the expectation of privacy of data, and the legal and political issues that dictate what is considered to be private data. Privacy concerns arise whenever personal identifiable information or other personal sensitive information is collected, stored, used, or otherwise disseminated.

SUMMARY

Disclosed is a computer-implemented method comprising invoking an API call. The method also comprises, determining, in the API call, a plurality of field names, and identifying a first field name to search for a first instance of sensitive information. The method also comprises, identifying a first instance of sensitive information in the first field name, wherein the first instance of sensitive information is identified by pattern matching. The method also comprises, generating, in response to the identifying the first instance of sensitive information, a first encryption key and a first expiration, wherein the first encryption key is configured to encrypt the first instance of sensitive information. The method also comprises, encrypting the first instance of sensitive information, sending the API call to an application server, wherein the application server is configured to process the API call. The method also comprises, receiving at a first time, from the application server, a request for the first encryption key, and validating that the first time is before the first expiration. The method also comprises, sending, in response to determining the encryption key is valid, the first encryption key to the application server, and storing, in a usage database, a set of usage data associated with the first encryption key. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
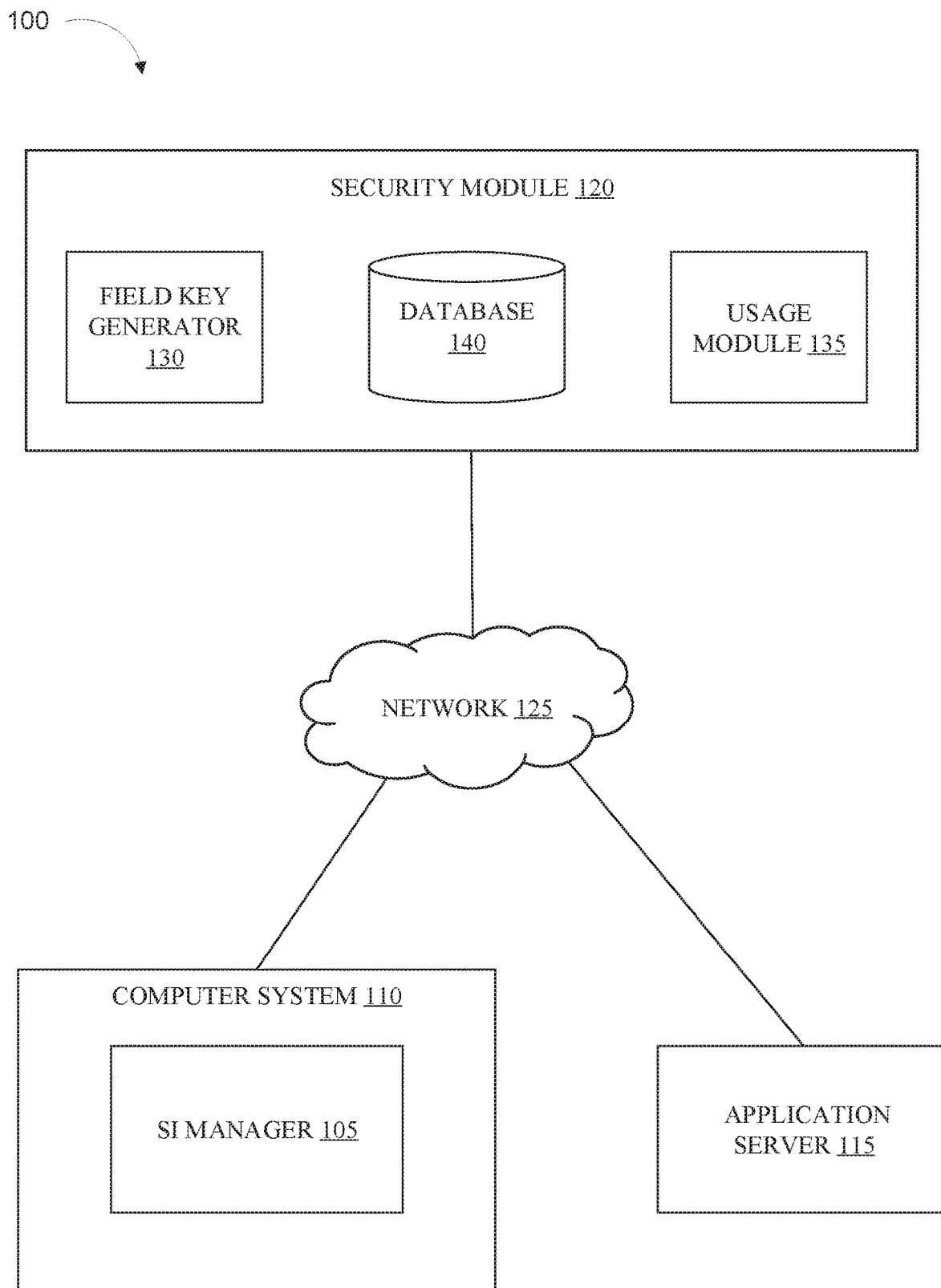
FIG. 1 illustrates a functional diagram of a computing environment suitable for operation of a sensitive information manager in accordance with various embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the current disclosure relate to data protection, and, more specifically, to protecting personal data during an individual API call. Aspects of the present disclosure may be better appreciated in light of the aforementioned applications.

Information privacy (e.g., data privacy or data protection) is the relationship between the collection and dissemination of data, the technology used to collect and disseminate data, the public's expectation of privacy of the data, and the legal and political issues that dictate what is considered to be private data. Privacy concerns arise whenever personally identifiable information or other sensitive information is collected, stored, used, or otherwise disseminated.

Many new and developing technologies require users to share their personal information to adequately utilize the offered services. For example, online shopping can ask a user to provide a shipping address for purchased goods. In some cases, the company (application owner, processor, data processor) that first collects the personal information transfers the data to third parties to assist in completion of an API call. For example, a bank may send data about a customer to a third party to request a credit score of the customer.

The amount of personal data that is used and shared by these technologies is rapidly increasing. The rapid increase has led to new concerns relating to the protection of privacy and the prevention of misuse of the personal information of technology users. Users of these technologies are inquiring as to how and when data they provide is being used, and the methods used to secure their personal information.

Breaches of personal data can happen in a variety of ways. Those that garner the most attention are large scale breaches, often caused by incorrect technical configurations or lack of due care on an industrial scale. Embodiments of the present disclosure recognize information can be compromised on a small scale. Small scale breaches may be harder to detect or may not garner the same amount of outside attention as large breaches. However, small scale breaches can have equally negative consequences to the victim and to the entities responsible for the breach.

Embodiments of the current disclosure can detect and protect sensitive data at the transaction level. One example of a transaction can be a request through an API or API call. In some embodiments, the API call is divided into one or more field names or fields. A field name is a heading/term descriptive of the data contained under that field name. For example, a field name can be "Customer Number" and the data contained under the field name can be 54321.

The term personally identifiable information (PII) may cover any type of information that can be used to identify an individual based on that information. Some examples of PII include social security numbers, European identifiers, drivers license numbers, and the like. Sensitive personal information (SPI) refers to information that does not identify an individual but is related to an individual and communicates information that is private or could potentially harm the individual. Examples of SPI include biometric data, genetic information, gender, trade union memberships, sexual orientation, and the like. Sensitive information (SI) or sensitive data refers to any data that is either PII, SPI, and/or other data that may be considered confidential.

Various embodiments of the present disclosure can identify and protect data that should be kept secure. In some embodiments, the sensitive data is identified in an API call or other transaction request. An API can be organized by field names. In some embodiments, the data contained in the field names can be generalized then examined for data that should be secure. In some embodiments, a key, such as an encryption key, can be generated and the data secured prior to sending the data over any network where it could potentially be compromised. The key can be generated by the device that generates the API call or by a separate device (or module, program, etc.). In some embodiments, the key is only valid under a specific set of conditions (e.g. before an expiration, etc.) In some embodiments, the target of the API call can then request the key to decrypt the data. In some embodiments, the actions related to the key (e.g. generation, distribution, etc.) are recorded, and can be delivered to the data owner.

In some embodiments, pattern identification is used to detect and protect sensitive information in API calls. In some embodiments, a solicitor service can be used to detect and protect sensitive information in API calls. The solicitor service can be a Key Management Server (KMS) as an example. This can increase the efficiency of computing systems by only encrypting specific data, rather than all of the data in an API call.

In some embodiments, encryption may be used to protect API calls with sensitive information. In some embodiments, the encryption and/or decryption can be time based. In some embodiments, the solicitor service can implement the encryption and use different security settings such as Block All principle. The Block All principle is when all access to the encryption is blocked unless a set of conditions are met. In some embodiments, the conditions to allow access to an encryption key can be that (1) the data processor is explicitly permitted to retrieve the key, and that (2) the expiration has not passed.

The aforementioned advantages are example advantages, and embodiments exist that can contain all, some, or none of the aforementioned advantages while remaining within the spirit and scope of the present disclosure.

Referring now to various embodiments of the disclosure in more detail, FIG. 1 is a representation of a computing environment, generally labeled 100, that is capable of running a sensitive information (SI) manager 105, in accordance with one or more embodiments of the present disclosure. Many modifications to the depicted environment may be made by those skilled in the art without departing from the scope of the disclosure as recited by the claims.

Computing environment 100 includes computer system 110, application server 115, security module 120, and network 125. Network 125 can be, for example, a telecommunications network, a local area network (LAN), a wide area network (WAN), such as the Internet, or a combination of the three, and can include wired, wireless, or fiber optic connections. Network 125 may include one or more wired and/or wireless networks that are capable of receiving and transmitting data, voice, and/or video signals, including multimedia signals that include voice, data, and video information. In general, network 125 may be any combination of connections and protocols that will support communications between computer system 110, application server 115, security module 120, and other computing devices (not shown) within computing environment 100.

Computer system 110 can be a standalone computing device, a management server, a web server, a mobile computing device, or any other electronic device or computing system capable of receiving, sending, and processing data. In other embodiments, computer system 110 can represent a server computing system utilizing multiple computers as a server system, such as in a cloud computing environment. In some embodiments, computer system 110 represents a computing system utilizing clustered computers and components (e.g., database server computers, application server computers, etc.) that act as a single pool of seamless resources when accessed within computing environment 100. Computer system 110 includes SI manager 105. Computer system 110 may include internal and external hardware components, as depicted and described in further detail with respect to FIG. 3.

In some embodiments, computer system 110 invokes an API call. In some embodiments, invoking can include generating and/or facilitating an API call. An API call can be a request to perform one or more processes by an application or a web application. In some embodiments, computer system 110 may be known as a service requestor or an API requestor.

Application server 115 can be a standalone computing device, a management server, a web server, a mobile computing device, or any other electronic device or computing system capable of receiving, sending, and processing data. In other embodiments, computer system 110 can represent a server computing system utilizing multiple computers as a server system, such as in a cloud computing environment. In some embodiments, application server 115 can host one or more web applications. In some embodiments, application server 115 can be known as an API provider. In various embodiments, application server 115 can be an API provider, an application owner, and/or a data processor.

Security module 120 can be any combination of hardware and/or software configured to identify, protect, and monitor PII, SPI, and/or SI. In some embodiments, security module 120 can be included in computer system 110. In some embodiments, security module 120 is a module of SI manager 105. In some embodiments, security module 120 analyzes data to determine if that data is SI. In some embodiments, SI is identified by pattern matching. In some embodiments, security module 120 can be a solicitor service (e.g. key management server).

In some embodiments, security module 120 generates and provides encryption keys in response to an API call. In some embodiments, security module 120 can provide the encryption key to application server 115, allowing decrypting and processing of SI in the API call. Security module 120 includes field key generator 130, usage module 135, and database 140.

Field key generator 130 creates and destroys field keys for the encryption and decryption of SI. In some embodiments, field key generator 130 creates an encryption key for SI in an API Call. In some embodiments, field key generator 130 generates one encryption key for all SI in the API call. In some embodiments, field key generator 130 generates separate encryption keys for each instance of SI in the API call. In some embodiments, each encryption key generated includes an expiration time. The expiration time is a time after which the key is no longer valid. In some embodiments, the expiration time is a predetermined period of time. In some embodiments, the expiration time is based on information provided in the API call. In some embodiments, the expiration time is based on the application in application server 115 to which the API call is directed. In some embodiments, the expiration time is based on the type of SI present in the API call.

In some embodiments, field key generator 130 generates an encryption key in response to security module 120 identifying SI in the API call. In some embodiments, field key generator 130 records every action in database 140 (e.g. key generated, key destroyed, etc.).

Usage module 135 compiles data and generates reports relating to the use and access to SI. In some embodiments, usage module 135 creates a report for a client. The report can include the number of times the client SI was used in a call (e.g. processed, decrypted, etc.), which web applications had access to the client SI, failed access attempts to the client SI, and other similar information related to the client SI. The report can be generated upon request, in response to a predetermined trigger (e.g. an application request key after expiration) and/or at regular intervals (e.g. weekly, monthly, etc.). In some embodiments, usage module 135 generates reports from data stored in database 140.

Database 140 can be any combination of hardware and/or software configured to store data for security module 120. In some embodiments, database 140 can store data generated by security module 120, field key generator 130, and/or usage module 135. In some embodiments, database 140 contains the patterns used to identify SI in API calls.

Figure 2:
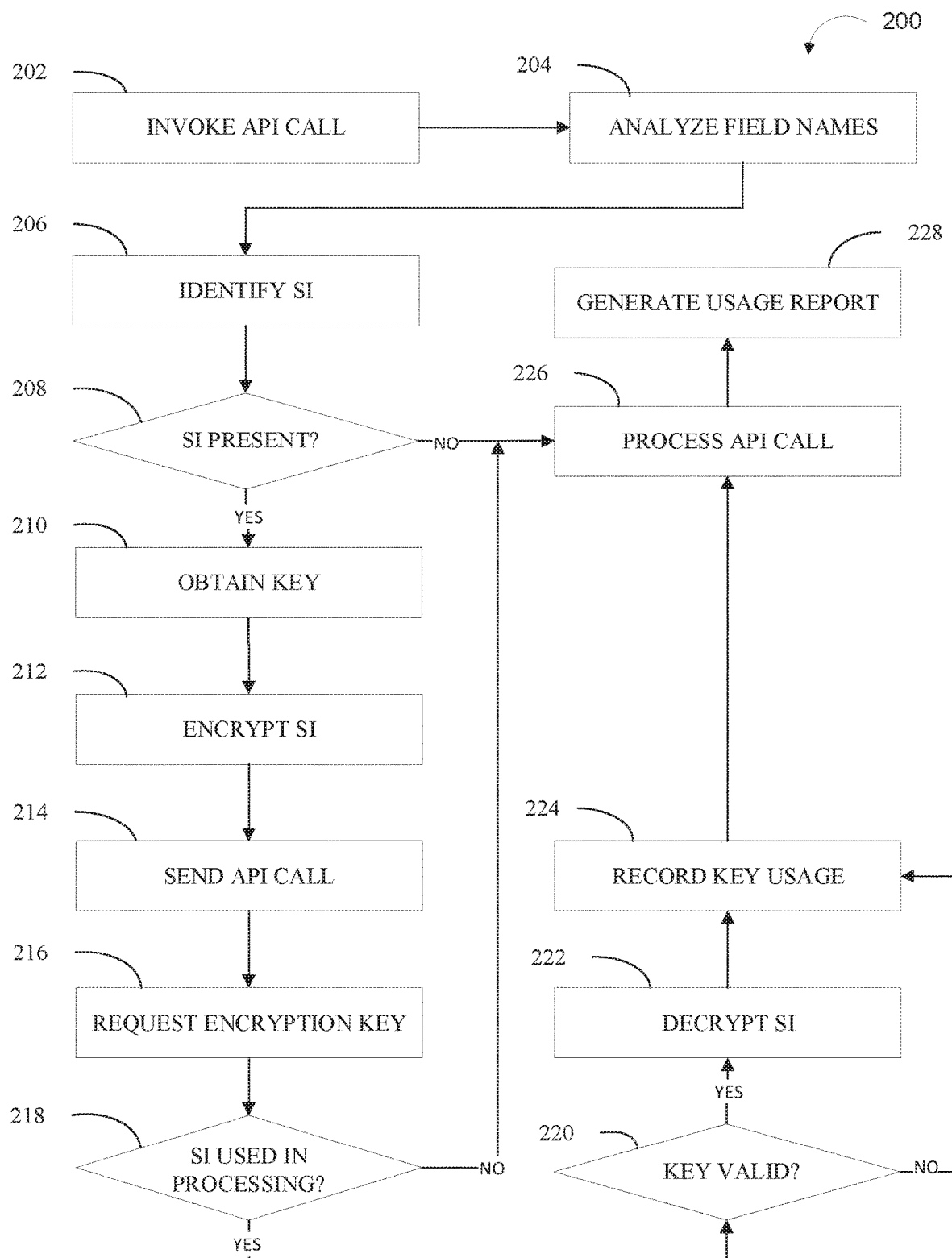
FIG. 2 is a flowchart depicting an example method for detecting and protecting sensitive information, in accordance with various embodiments of the present disclosure.

FIG. 2 depicts a flowchart of an example method for detecting and protecting sensitive information that can be performed in a computing environment (e.g., computing environment 100 and/or computer system 110). One or more of the advantages and improvements described above for detecting and protecting SI can be realized by the method 200, consistent with various embodiments of the present disclosure.

Method 200 can include more or fewer operations than those depicted. Method 200 can include operations in different orders than the order depicted. Likewise, the method 200 can include operations that occur simultaneously rather than sequentially. Many modifications to the depicted method may be made by those skilled in the art without departing from the spirit and scope of the present disclosure. Method 200 can be implemented by one or more processors, a SI manager (e.g., SI manager 105 of FIG. 1), a host computing device (e.g., computer system 110 of FIG. 1), or a different combination of hardware and/or software. In various embodiments, the various operations of method 200 are performed by one or more of SI manager 105, computer system 110, application server 115, security module 120, and/or other computing devices.

At operation 202, an API call is invoked. In some embodiments, the API call is invoked by a user/client through a computing device. In some embodiments, the API call occurs automatically. When invoked, the API call includes a set of data to be sent to the API provider, and instructions on how to process the data. In some embodiments, the data in the API call is categorized under one or more field names. In some embodiments, the API call includes processing by Java script object notation (JSON) and/or representational state transfer (REST) methods.

At operation 204, the field names are analyzed. In some embodiments, the data included in the API call can be organized under various fields each having a unique field name. The number and size of field names is dependent on the API call and the requirements of the entity processing the API call. In some embodiments, analyzing the field names includes determining if the fields have been previously associated with SI. In some embodiments, the data in the fields that have been previously associated with SI are reformatted to a form acceptable for pattern matching.

At operation 206, SI is identified. In some embodiments, the SI is identified by security module 120. In some embodiments, the SI is identified by scanning and/or searching the API for SI. In some embodiments the scanning/searching is performed by a solicitor service. In some embodiments, the scanning/searching is performed by security module 120. In some embodiments, the scanning/searching is performed by SI manager 105. In some embodiments, the data under a field name can include one or more instances of SI. In some embodiments, the SI is identified based on the field name. A field name can be a category of data that is always SPI or PII. For example, the field name could be a birthdate, and every entry under the field name can then be considered SPI.

In some embodiments, the SI is identified by pattern matching. For example, a social security number is 9 numbers in length and generally has the form: 3 numbers, dash, 2 numbers, dash, 4 numbers (e.g., 123-45-6789). Any set of numbers that has a similar pattern will be treated as PII. In some embodiments, the pattern matching is performed by security module 120.

In some embodiments, searching for SI includes preparing the data for pattern matching. In some embodiments, the data is prepared prior to running a pattern matching algorithm. This provides security for the SI in the event pattern matching is occurring at a remote location (e.g. security module 120 when the API call is invoked at computer system 110). The data can be sent across a network such as network 125 with no chance of having the SI compromised. In some embodiments, the data is prepared by generating a generic form of the data under the field names (e.g., if the data is Dec. 12 1984, then the generic form can be MMM DD, YYYY).

At operation 208, it is determined if SI is present in the API call. In some embodiments, the determination is based on the results of operation 206. If no SI is present in the API call (decision tree "NO" branch) then operation 226 is performed (further described herein). In some embodiments, operation 214 is performed with operation 226, when no SI is present (e.g. processing the API call with no encryption). If SI is present in the API call (decision tree "YES" branch) then operation 210 is performed.

At operation 210, encryption key(s) (e.g. private signature key, symmetric authentication key, symmetric data encryption key, Triple Data Encryption Standard, RSA, Advanced Encryption Standard (AES), etc.) is/are obtained. In some embodiments, the encryption key is generated by security module 120. In some embodiments, the encryption key is generated by field key generator 130. In various embodiments, different numbers of keys can be generated for different API calls. For example, there can be one encryption key for the entire API call, a separate encryption key for each field name, or a separate encryption key for each instance of SI in the API call (e.g. multiple keys under the same field name). In some embodiments, an expiration is generated with each encryption key. The expiration can be a period of time (e.g. less than or equal to 30 seconds, 10 minutes, 30 minutes, 1 hour, 6 hours, etc.), a number of uses (e.g. less than or equal to one use, 5 uses, unlimited uses etc.), or other similar parameters. In some embodiments, each generated encryption key and its associated expiration are stored in database 140.

At operation 212, the SI is encrypted. In some embodiments, the SI is encrypted using the encryption keys generated in operation 210. At operation 214, the API request is sent to a processor. In some embodiments, the processor is any computing machine that can process the API call. In some embodiments, the API call is sent to application server 115. In some embodiments, a key requestor is sent with the API call. The key requestor includes instructions for the recipient on how to obtain the encryption key to process the data.

At operation 216, a request is received for the encryption key. In some embodiments, the request is received from the entity to which the API call is sent. In some embodiments, the request is received from application server 115.

At operation 218, it is determined if SI will be used in processing the API call. SI is used in processing when the encrypted SI must be decrypted to fully process the API call. In some embodiments, it is determined if SI will be used in processing if SI is present in the API call. In some embodiments, data in in the original API call will indicate SI is needed for processing.

In some embodiments, it is determined that SI will be used in processing after application server 115 attempts to process the API call but cannot complete it because of the encryption. In some embodiments, it is determined that SI will be used if a request for the encryption key is received.

If SI is not used in processing (decision tree "NO" branch) then operation 226 is performed. If SI is used in processing (decision tree "YES" branch) then operation 220 is performed.

At operation 220, it is determined if the encryption key is valid. In some embodiments, the encryption key is valid if it has not expired. In some embodiments, the encryption key is valid if it has never been used. In some embodiments, the validity of the encryption key can be associated with a specific processor/entity that is the target of the API call. In these embodiments, the target is stored in database 140 along with the key at the time the key is generated.

If the key is not valid (decision tree "NO" branch), then operation 224 is performed. If the key is valid (decision tree "YES" branch), then operation 222 is performed.

At operation 222, the SI is decrypted. In some embodiments, the decryption is in response to determining the encryption key is valid. In some embodiments, the decryption is in response to obtaining the encryption key. In some embodiments, the decryption is performed by the processor (e.g. application server 115). The encryption key is obtained by the decrypting party prior to decryption. In some embodiments, the encryption key is obtained from security module 120. In some embodiments, the encryption key is obtained from SI manager 105.

At operation 224, the key usage is recorded. In some embodiments, key usage includes the request for the key, determination if the SI associated with the key will be used in processing, whether the key is valid at the time of the key request, the time of decryption, the processor that performed decryption, the number of decryptions, etc.

At operation 226, the API call is processed. In some embodiments, the API call is processed by application server 115. In some embodiments, the API call is processed according the invoking instructions.

At operation 228 a usage report is generated. In some embodiments, the usage report is generated by security module 120. In some embodiments, the usage report is generated by usage module 135. In some embodiments, the usage report is generated for an individual client/user. In some embodiments, the usage report can be sent or displayed to the client. Usage reports can be generated after a predetermined period of time (e.g. weekly), after a user requests a report, after each time PII or SPI is processed, or any other trigger. In some embodiments, the usage report can be generated to show a macro view of SPI and PII usage. The usage report can show data based on type of PII or SPI, field name, the application processing the data, the operator of application server 115, and any other information stored in database 140. For example, one usage report can be generated that shows each time a social security number has been processes by an application owner in the last 30 days.

Figure 3:
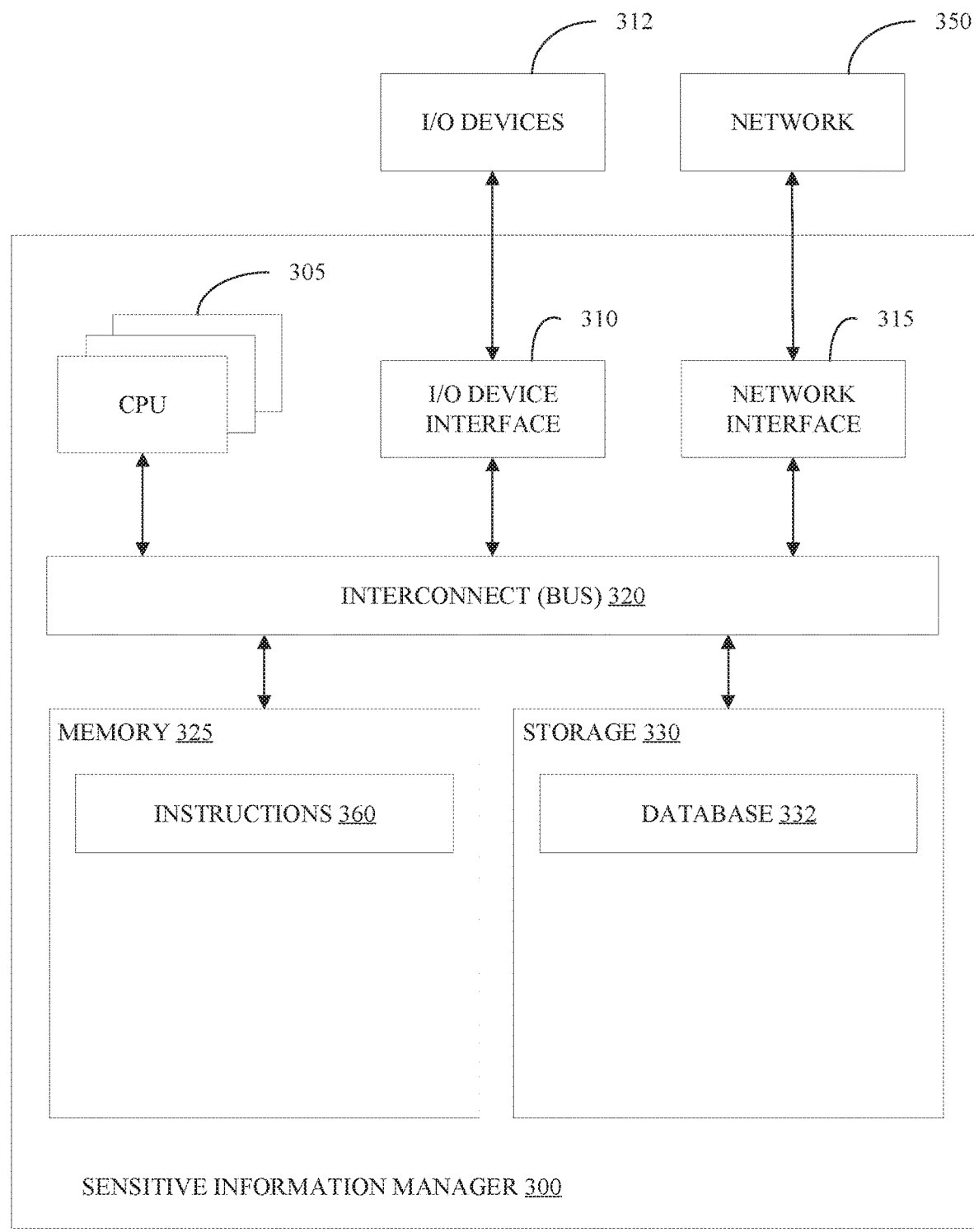
FIG. 3 illustrates a block diagram of an example sensitive information manager, in accordance with various embodiments of the present disclosure.

FIG. 3 illustrates a block diagram of an example SI manager 300 in accordance with some embodiments of the present disclosure. In some embodiments, SI manager 300 can perform the method 200 as described in FIG. 2. In some embodiments, SI manager 300 provides instructions for the method 200 of FIG. 2 to a client machine such that the client machine executes the method, or a portion of the method, based on the instructions provided by the SI manager 300.

The SI manager 300 includes a memory 325, storage 330, an interconnect (e.g., BUS) 320, one or more CPUs 305 (also referred to as processors 305 herein), an I/O device interface 310, I/O devices 312, and a network interface 315.

Each CPU 305 retrieves and executes programming instructions stored in the memory 325 or storage 330. The interconnect 320 is used to move data, such as programming instructions, between the CPUs 305, I/O device interface 310, storage 330, network interface 315, and memory 325. The interconnect 320 can be implemented using one or more busses. The CPUs 305 can be a single CPU, multiple CPUs, or a single CPU having multiple processing cores in some embodiments. In some embodiments, CPU 305 can be a digital signal processor (DSP). In some embodiments, CPU 305 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP CPU configurations)). Memory 325 is generally included to be representative of a nonvolatile memory, such as a hard disk drive, solid state device (SSD), removable memory cards, optical storage, or flash memory devices. In an alternative embodiment, the storage 330 can be replaced by storage area-network (SAN) deices, the cloud, or other devices connected to the SI manager 300 via the I/O device interface 310 or a network 350 via the network interface 315.

In some embodiments, the memory 325 stores instructions 360 and the storage 330 stores database 332. However, in some embodiments, the instructions 360 and database 332 are stored partially in memory 325 and partially in storage 330, or they are stored entirely in memory 325 or entirely in storage 330, or they are accessed over a network 350 via the network interface 315.

Instructions 360 can be processor-executable instructions for performing any portion of, or all of, any of the method 200 of FIG. 2.

Database 332 can be a storage medium configured to store all actions completed by SI manager 300. In some embodiments, database 332 can be consistent with database 140 of FIG. 1.

In some embodiments, the I/O devices 312 include an interface capable of presenting information and receiving input. For example, I/O device 312 can present information to a user interacting with SI manager 300 and receive input from the user.

SI manager 300 is connected to the network 350 via the network interface 315. Network 350 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instruction can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instruction can also be stored in a computer readable storage medium that can direct a computer, a programmable data processing apparatus, and/or other devices to function in a particular manner, such that the computer readable storage medium having instructions stored therein comprises an article of manufacture including instructions which implement aspect of the function/ act specified int eh flowchart and/or block diagram block or blocks.

The computer readable program instruction can also be loaded onto a computer, other programmable data processing apparatus, or other device to cause a series of operations steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 360 of FIG. 3 and/or any software configured to perform any subset of the methods described with respect to FIG. 2) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
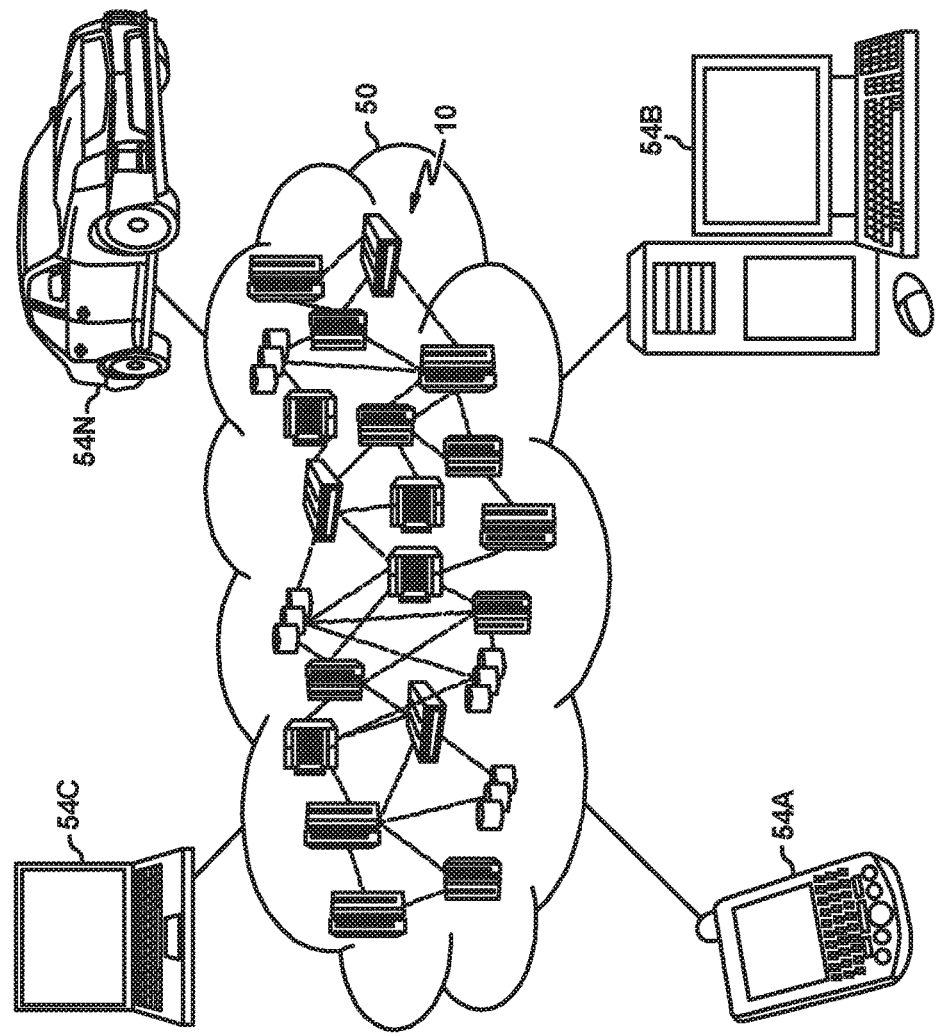
FIG. 4 illustrates a cloud computing environment in accordance with some embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
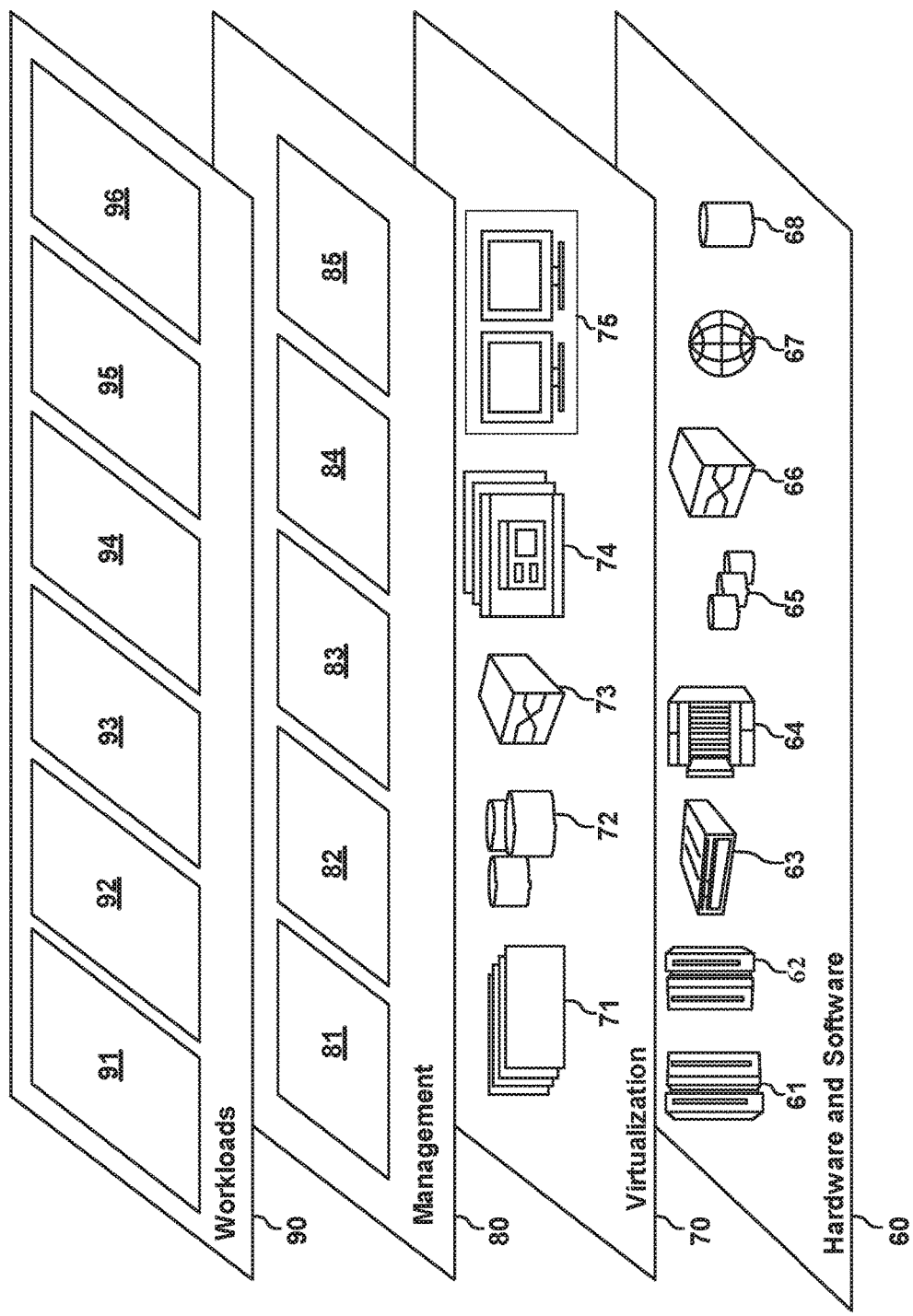
FIG. 5 depicts abstraction model layers in accordance with some embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; encryption key generation 93; data analytics processing 94; transaction processing 95; and SI detection and protection 96.

What is claimed is:

1. A system comprising:
   a processor; and
   a computer-readable storage medium communicatively coupled to the processor and storing program instructions which, when executed by the processor, are configured to cause the processor to perform a method comprising:
   invoking an application program interface (API) call;
   determining, in the API call, a plurality of field names;
   identifying a first field name to search for a first instance of sensitive information (SI);
   identifying the first instance of SI in the first field name by pattern matching;
   generating, in response to the identifying the first instance of sensitive information, a first encryption key and a first expiration;
   encrypting the first instance of sensitive information using the first encryption key;
   sending the API call to an application server, wherein the application server is configured to process the API call;
   receiving, at a first time, from the application server, a request for the first encryption key;
   validating the first encryption key by determining that the first time is before the first expiration;
   sending, in response to determining the first encryption key is valid, the first encryption key to the application server; and
   storing, in a usage database, a set of usage data associated with the first encryption key.

2. The system of claim 1, wherein the program instructions are further configured to cause the processor to perform the method, further comprising:
   generating a usage report, wherein the usage report comprises the set of usage data associated with the first encryption key.

3. The system of claim 2, wherein the program instructions are further configured to cause the processor to perform the method, further comprising:
   sending the usage report to a first client, wherein the first client owns the first instance of SI.

4. The system of claim 1, wherein the validating further comprises determining the application server will use the first instance of SI to process the API call.

5. The system of claim 1, wherein the program instructions are further configured to cause the processor to perform the method further comprising:
   identifying a second instance of SI; and
   generating, in response to identifying the second instance of SI, a second encryption key.

6. A computer program product, the computer program product comprising a computer readable storage medium having program instructions embodied therewith, the program instructions executable by a processing unit to cause the processing unit to perform a method comprising:
   invoking an application program interface (API) call;
   determining, in the API call, a plurality of field names;

identifying a first field name to search for a first instance of sensitive information (SI);

identifying the first instance of SI in the first field name by pattern matching;

generating, in response to the identifying the first instance of SI, a first encryption key and a first expiration, wherein the first encryption key is configured to encrypt the first instance of SI;

encrypting the first instance of SI;

sending the API call to an application server, wherein the application server is configured to process the API call;

receiving, at a first time, from the application server, a request for the first encryption key;

validating the first encryption key by determining that the first time is before the first expiration;

sending, in response to determining the first encryption key is valid, the first encryption key to the application server; and storing, in a usage database, a set of usage data associated with the first encryption key.

7. The computer program product of claim of claim 6, wherein the program instructions are further configured to cause the processing unit to perform the method further comprising:

generating a usage report, wherein the usage report comprises the set of usage data associated with the first encryption key.

8. The computer program product of claim of claim 7, wherein the program instructions are further configured to cause the processing unit to perform the method further comprising:

sending the usage report to a first client, wherein the first client owns the first instance of SI.

9. The computer program product of claim 6, wherein the validating further comprises determining the application server will use the first instance of SI to process the API call.

10. The computer program product of claim of claim 6, wherein the program instructions are further configured to cause the processing unit to perform the method further comprising:

identifying a second instance of SI; and generating, in response to identifying the second instance of SI, a second encryption key.

\* \* \* \* \*